United States Patent Office 2,772,793
Patented Dec. 4, 1956

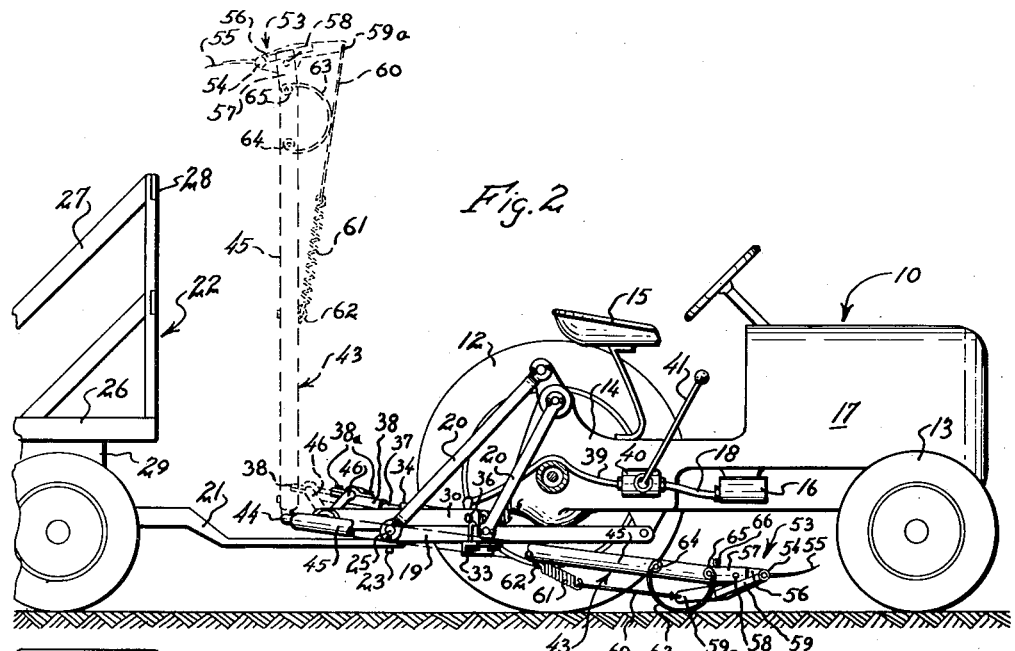

2,772,793

BALE LOADER

Reinhard C. Brusewitz, Bagley, Minn.

Application January 13, 1954, Serial No. 403,860

5 Claims. (Cl. 214—42)

This invention relates to a bale loader and more particularly to a bale loading attachment which is adapted to be mounted at the rear of a traveling vehicle such as a tractor and to be used in conjunction with a drawn vehicle such as a hayrack disposed at the rear thereof.

It is an object of the invention to provide an inexpensive and simple device which will efficiently pick up a bale and the like from the ground to one side of the traveling vehicle and in full sight of the operator, said bale then being elevated and moved rearwardly by a single powered movement which will bring the bale from the side of the vehicle to a medial upper position overlying the hayrack, at which point the bale is conveniently discharged to the drawn transporting vehicle.

It is another object of the invention to provide a bale loading attachment which can be supported at the rear of a tractor and having an angulated arm journaled for reciprocation so as to bring the arm above and toward the medial area of a drawn transporting apparatus, the device carrying an impaling portion at the forwardly extending end thereof which is likewise angled and pivoted to the device such that the bale will be impaled squarely by the device to the side of the traveling vehicle and discharged squarely from the device without necessitating separate means for elevating upwardly and rearwardly then transversely into position over the drawn transporting apparatus.

It is a further object of the invention to provide a bale loader having a simple mounting and being manually actuated by the driver of the traveling vehicle to which the device is attached, said device simulating manual pitch fork operation in impaling a bale adjacent the ground and elevating the bale sideways and upwardly for discharge in a twisting movement which will facilitate freeing of the bale from the impaling portion of the device without tearing or rupturing the bale.

These and other objects and advantages of my invention will more fully appear from the following description made in connection with the accompanying drawings wherein like reference characters refer to similar parts throughout the several views and in which:

Fig. 1 is a top plan view of my bale loader mounted at the rear of a tractor which in turn has attached thereto a transporting vehicle. The bale loader is in lowered, bale-impaling position and unessential portions of the vehicle are cut away;

Fig. 2 is a side elevation of my bale loader device as shown in Fig. 1, the uppermost or bale unloading position of the device being illustrated in dotted lines; and Fig. 3 is an enlarged detailed and segmental vertical section of the power means and eccentric connection with the loading arm taken on the line 3—3 of Fig. 1.

Referring now to the drawing, the numeral 10 indicates generally a traveling vehicle such as an ordinary farm tractor having a pair of rear driving wheels 11 and 12, forward wheels 13, a framework 14 and an operator's seat 15, all as clearly shown in Figs. 1 and 2. The tractor device may further be equipped with hydraulic power means 16 operated by the tractor engine 17 to furnish fluid pressure through hydraulic line 18 as is commonly furnished as an accessory for tractor vehicle.

The traveling vehicle or tractor 10 is further provided with a supporting framework 19 which is adapted to be supported to the framework 14 of tractor 10 and has one or more brace members 20 interposed between supporting structure 19 and the framework 14 as shown in Figs. 1 and 2. The draw bar 21 of a transporting vehicle shown generally at 22 may be secured to the tractor supporting structure 19 through the conventional pin and clevis arrangement 23. The supporting structure 19 may be provided with a rear bar 24 having a plurality of openings 25 spaced therealong and adapted to engage the clevis arrangement 23 at a variety of lateral positions for shifting the alignment of the transporting vehicle 22 in a parallel manner with the longitudinal center line of tractor 10. The transporting vehicle 22 may comprise an ordinary hayrack having a bottom 26, side rack members 27, front rack members 28 and a wheeled frame structure 29 as shown in Fig. 2.

My invention is a bale loading device which is mounted in a particular manner on the tractor 10 so as to enable a driver of the tractor to pick up a bale or the like from the side of the tractor 10 as it travels along the ground and elevate the bale in a single sweeping movement, from the side of the tractor and over to the medial area at the front of hayrack 22, the bale then being automatically discharged to the hayrack from which position it can be further stacked or positioned by a second operator standing on the haystack 22 and its contents. The bale loading device has novel angular construction and mounting which makes it possible for a single arm element to operate from the bale loading position to the bale unloading position without a series of complex movements, and, in fact being accomplished by a single swinging movement of the device.

The bale loading device comprises mounting means for the moving portion of the device and for the means which supply power thereto. The bale loading device may be attached directly to the supporting framework 19 or may have additional supporting and mounting members such as the angle irons 30 and 31 as shown in Fig. 1. Cross braces 32 and 33 may be supplied to maintain the angle irons 30 and 31 in spaced rigid relation as shown.

Power means such as hydraulic jack 34 may be mounted with one end thereof in pivotal connection 35 with the shaft 36 and the forwardly extending portion 37 being pivotally and eccentrically secured at 38 to the loading arm mechanism as will be presently described. The power means 34 is extensible and retractable and may be caused to extend and retract by virtue of hydraulic power means supplied through the line 39 after having been valved or otherwise controlled through the manually operable control device 40 which in turn has a reciprocable handle 41 conveniently located for an operator positioned on seat 15 of the tractor 10. Preferably, only a single fluid line 39 is supplied to cause the hydraulic ram 34 to extend at the forward rod 37, the retraction of the device being accomplished by spring means 42 as will be described below.

The loading arm proper is indicated at 43 and has a rearward shaft portion 44 which is journaled transversely of the longitudinal center line of the tractor 10, and has a forwardly extending elongated portion 45 which extends from the rear of the tractor wheel 12 outwardly then forwardly to the side of the tractor as shown in Fig. 1. The shaft 44 has an eccentric or crank portion 46 which is pivotally engaged by the bearing connection 38, which in the instant case comprises a pair of registered bearing members bolted together at 38a for rotation about shaft 44 at the eccentric 46 as shown. The eccentric crank 46 is normally in a forward position with respect to tractor 10 when the elongated arm 45 is in its lowermost bale loading position. Spring 42 may be interposed between the crank 46 through a bracket connection 47 and an attaching member such as the eye-bolt 48 having its eye 49 secured to one end of tension spring 42 and the other end of the tension spring being secured to the bracket 47. The threaded portion 50 of the eye-bolt 48 is adjustably secured as by nut 51 to a bored bracket 52 rigidly attached to the frame member or angle iron 31 as shown in Fig. 3. A tension is maintained on spring 42 so as to urge the forwardly extending arm 45 downwardly toward the ground.

An impaling head 53 is pivotally mounted adjacent the forward end of arm 45 as shown in Fig. 1. The impaling head 53 comprises a cross arm 54 to which forwardly extending pointed elements 55 are attached, the impaling elements 55 preferably being curved upwardly as shown in Fig. 2. A rigid bracket element 56 is attached to the cross member 54 intermediate its ends and is disposed at an angle such that the included angular relationship between the cross arm and bracket 56 will be less then 90° at the side facing inwardly toward the tractor 10 as shown in Fig. 1. Bracket 56 is in turn mounted to a clevis 57 angularly formed at the end of arm extension 45 by such means as pin 58. It will be noted that the clevis 57 is angled in such a manner that it tends toward the forward direction of travel but does not lie completely parallel to the longitudinal center line of tractor 10. The angularity of cross arm 54 with respect to bracket 56 however compensates for the difference in angulation and thus brings the cross head 54 into substantially right angle relation with the forward direction of travel. Braces 59 extend downwardly and terminate at their apex in a lever arm 59a as shown in Figs. 1 and 2. A cable or line 60 is secured at one end to the lever arm 59a and at the other end to a tension spring 61 which in turn is secured at its outer end at 62 to the underside of arm extension 45. The tension spring 61 normally maintains the impaling head 53 in its downward position as shown in Fig. 2. The impaling head 53, however, may be rotated forwardly and rearwardly so as to assume the dotted line position of Fig. 2, the tension spring 61 causing the impaling head to return to normal position when torque is removed from the impaling head.

A skid element 63 is attached to the arm 45 as shown in Figs. 1 and 2 and may comprise a spring band secured at 64 and 65 to the arm 45 and presenting a curved surface for contacting the ground as shown in Fig. 2. When thus contacting the ground the impaling head will be maintained in spaced relation with the impaling point 55 in bale-contacting position. An adjusting screw 66 may be provided to vary the normal position of impaling points 55.

In the operation of my loading device the loading arm is disposed with its forward elongated projection 45 in the position shown in full line in Figs. 1 and 2. The hydraulic ram 34 will then be relaxed and the tension spring 42 will cause the elongated arm to rest resiliently with its skid member 63 in gliding contact with the surface of the ground. The impaling points 55 will then be spaced above the surface of the ground as shown in Fig. 2. Irregularities in the surface contours will be taken up by the resilient movement of the arm so as to maintain the points 55 at approximately a constant height above the ground.

When a bale is approached the driver of the vehicle 10 will steer slightly to the left of the bale so as to align the impaling head therewith and cause the points to engage the bale and project thereinto. Immediately upon piercing the bale he then actuates the lever 41 causing a fluid pressure to be transmitted to the hydraulic ram 34. The ram extension 37 will then impart torque upon the shaft 44 through its crank 46 and cause the loading arm to rise against the tension of spring 42. The bale will then be carried upwardly, rearwardly and inwardly toward the longitudinal center line passing through the tractor 10 and the upper portion of the elongated arm 45 will then overlie the transporting vehicle 22 at a forward and central position as shown by the dotted lines of Fig. 2. The hydraulic ram is constructed to reach its outer limit when the elongated arm 45 is substantially vertical and the upward swinging movement of the arm will be quickly stopped in substantially the dotted line position of Fig. 2. The bale (not shown) impaled upon impaling head 53 will have a certain amount of momentum which will cause the impaling head to rotate in a counter-clockwise arc as viewed in Fig. 2, the impaling head then rotating about pivot 58 and against the tension spring 61. The impaling head will normally rotate through approximately a 90° arc and acquire a substantially horizontal position as shown in dotted lines in Fig. 2. It will be noted that the angulation of the forward extension of arm 45 together with the angulation of the bracket member 56 on the impaling head 53, will cause the impaling head to assume the horizontal position as shown. Thus the impaling head is substantially horizontal and normal to the longitudinal direction of travel in its bale-loading position and again becomes substantially horizontal and normal to the direction of travel of the vehicle and the transporting rack at its uppermost position. The foregoing occurs despite a twisting movement of the bale during the raising thereof in which the impaling head is angulated downwardly and inwardly toward the tractor during the upward swing and prior to the final pivotal movement in response to the momentum of the bale. The bale will thus be delivered in normal manner to a central area in the forward end of the rack portion 26 where it can be further moved if desired by an operator standing on the rack.

It will be observed that I have accomplished the impaling of a bale and the like from the side of a tractor member with a loading arm comprising a rigid angulated structure bearing a pivotal impaling head at the forward end thereof, the arm having simplicity and strength and being capable of delivering the bale firmly and quickly to the hayrack drawn behind the tractor in clearing relation with the side members of the rack and without exerting an abnormal stress upon the bale during the operation. The loading of the bale requires a drastic movement from the ground to a position of substantial height and a movement inwardly from one side of the tractor to a position substantially in alignment with its center longitudinal line, all with a small amount of parts and material and with a minimum amount of stress applied thereto.

It will, of course, be understood that various changes may be made in the form, details, arrangement and proportions of the parts without departing from the scope of my invention which consists of the matter shown and described herein and set forth in the appended claims.

What is claimed is:

1. A bale loading device for picking up bales and the like from the ground beside a traveling vehicle such as a tractor and depositing them on a transporting apparatus drawn at the rear of said vehicle, said bale loading device comprising a rotatable shaft journaled substantially horizontal and angulated outwardly and somewhat rearwardly of one side of said vehicle, a loading arm extension rigidly secured to the rotatable shaft and at an outward position thereon, said loading arm normally extending forward at the side of said vehicle and in clearance therewith, an impaling head having forwardly extending tines mounted at a forward position on said loading arm and being swingable to an upwardly transverse position with respect thereto, said forwardly extending tines being substantially in alignment with said longitudinal center line of the traveling vehicle in its normal lowered position so that said tines can engage a bale and the like in impaling relation, extensible and retractable power means in driving connection with said shaft for rotating the shaft through an arc and thereby swinging said loading arm upwardly and rearwardly toward a medial area of the transporting apparatus, resilient means interposed between said loading arm and said impaling head urging said impaling head into general alignment with the loading arm, and abutment means operably associated with said extensible and retractable power means for limiting the movement of said loading arm in its upward and rearward travel so as to stop the arm together with a bale impaled on said tines in upstanding relation in its rearwardmost travel toward the medial area of said transporting apparatus, whereby the momentum of said bale will cause said impaling head to be swung against the influence of said resilient means to permit ejection of the bale in the direction of said medial area of the transporting apparatus.

2. A bale loading device for picking up bales and the like from the ground beside a traveling vehicle such as a tractor and depositing them on a transporting apparatus drawn at the rear of said vehicle, said bale loading device comprising an elongated reciprocable loading arm having a rear portion journaled transversely to the longitudinal center line of the traveling vehicle and angulated forwardly from the rear of said vehicle to a position at the side thereof, said forwardly extending portion of the elongated loading arm being angulated at least 90° with respect to the rearward journaled portion, an impaling head pivotally mounted and angulated with respect to the forward end of said extension, said impaling head being swingable on said extension against resilient force, and extensible and retractable power means connected eccentrically to said shaft for swinging said loading arm upwardly and rearwardly toward the medial area of said transporting apparatus, whereby said loading arm in its upward and rearward swinging movement with a bale impaled thereon will be brought to an overlying stopped position with respect to the traveling vehicle and said bale will be ejected from said impaling head when momentum of the head causes swinging movement thereof against said resilient force, said impaling head in its pivoted rearmost position assuming substantially horizontal relation with respect to the ground.

3. A bale loading device for picking up bales and the like from the ground beside a traveling vehicle such as a tractor and depositing them on a transporting apparatus drawn at the rear of said vehicle, said bale loading device comprising a rotatable shaft journaled transversely of the longitudinal center line of the traveling vehicle and angulated with one end disposed rearwardly of the other, a loading arm extension secured to the angulated shaft at the rearmost end and extending forwardly at the side of the vehicle, the angulation between said arm extension and the transverse shaft being at least 90°, an impaling head pivotally mounted on the forwardly extending arm and normally angulated therewith, extensible and retractable power means connected eccentrically to said shaft for swinging said loading arm upwardly and rearwardly toward the medial area of said transporting apparatus, and resilient means interposed between said loading arm and said impaling head whereby said loading arm in its forward and rearward swinging movement with a bale impaled thereon will be brought to an overlying stopped position with respect to the traveling vehicle and said bale will be ejected from said impaling head when momentum of the head causes pivotal movement thereon against said resilient means, said impaling head in its pivoted rearmost position assuming substantially horizontal relation with respect to the ground.

4. A bale loader for picking up bales and the like from the ground beside a traveling vehicle such as a tractor and depositing them on a transporting apparatus drawn at the rear of said vehicle, said bale loader comprising a loading structure for attachment at the rear of said vehicle, a shaft journaled transversely to the longitudinal center line of the traveling vehicle and having an outwardly and rearwardly extending end, a forwardly extended arm attached to said shaft at an angle of at least 90° therewith, a bracket pivotally mounted adjacent the forward terminus of said arm and angulated inwardly toward said vehicle, an impaling head secured to said bracket and further angulated with respect thereto so as to lie substantially at right angles to the direction of travel when said mounting arm is in forwardly extending bale loading position, extensible and retractable power means connected eccentrically to said shaft for swinging said loading arm upwardly and rearwardly toward the medial area of said transporting apparatus, and resilient means interposed between said loading arm and said impaling head whereby said loading arm in its upward and rearward swinging movement with a bale impaled thereon will be brought to an overlying stopped position with respect to the traveling vehicle and said bale will be ejected from said impaling head when momentum of the head causes pivotal movement thereof against said resilient means, said impaling head in its pivoted rearmost position lying substantially horizontal with respect to the ground.

5. A bale loader for picking up bales and the like from the ground beside a traveling vehicle such as a tractor and depositing them on a transporting apparatus drawn at the rear of said vehicle, said bale loader comprising a loading structure for attachment at the rear of said vehicle, a shaft journaled transversely to the longitudinal center line of the traveling vehicle and having an outwardly and rearwardly extending end, a forwardly extending elongated arm attached to said shaft end at an angle of at least 90° therewith, a bracket pivotally mounted adjacent the forward terminus of said arm at an angle with respect to the general longitudinal direction of said loading arm and tending toward the longitudinal direction of said vehicle, an impaling head secured to said bracket and lying substantially at right angles to the direction of travel when said loading arm is in forwardly extending position for impaling bales and the like, a crank element connected to said shaft, extensible and retractable power means extending between said mounting structure and said crank for swinging said loading arm upwardly and rearwardly toward the medial area of said transporting apparatus, and resilient means interposed between said loading arm and said impaling head whereby said loading arm in its forward and rearward swinging movement with a bale impaled thereon will be brought to an overlying stopped position with respect to the traveling vehicle and said bale will be ejected from said impaling head when momentum of the head causes pivotal movement thereof against said resilient means, said impaling head in its pivoted rearmost position lying substantially horizontal with respect to the ground.

References Cited in the file of this patent

UNITED STATES PATENTS

| Number | Name | Date |
|---|---|---|
| 1,105,916 | Myers | Aug. 4, 1914 |
| 1,149,910 | Gregory et al. | Aug. 10, 1915 |
| 2,321,630 | Shippee | June 15, 1943 |
| 2,634,003 | Williamson et al. | Apr. 7, 1953 |